United States Patent [19]

Jennnings et al.

[11] Patent Number: 5,172,539
[45] Date of Patent: Dec. 22, 1992

[54] AGRICULTURAL MACHINE WITH A CUTTERBAR DRIVEN BY A GENERALLY VERTICAL DRIVE SHAFT

[75] Inventors: Richard E. Jennnings, Manheim; Kenneth W. McLean, New Holland, both of Pa.

[73] Assignee: Ford New Holland, Inc., New Holland, Pa.

[21] Appl. No.: 753,584

[22] Filed: Sep. 3, 1991

[51] Int. Cl.$^5$ .......................................... A01D 34/66
[52] U.S. Cl. .......................................... 56/6; 56/13.6; 56/14.7
[58] Field of Search .................. 56/6, 14.7, 16.4, 13.5, 56/13.6

[56] References Cited

U.S. PATENT DOCUMENTS

| | | | |
|---|---|---|---|
| 3,550,360 | 12/1970 | Van Der Lely | 56/6 |
| 4,199,922 | 4/1980 | Van Der Lely | 56/13.6 |
| 4,719,742 | 1/1988 | Ermacora et al. | 56/13.6 X |
| 4,899,523 | 2/1990 | Frumholtz et al. | 56/13.6 X |

Primary Examiner—Terry Lee Melius
Attorney, Agent, or Firm—Larry W. Miller; Frank A. Seemar

[57] ABSTRACT

An agricultural machine such as a mower conditioner includes a cutterbar carried by a header that is suspended from a frame. The cutterbar has a plurality of individual cutting units with two end cutting units located adjacent opposed sides of the frame and intermediate cutting units disposed between the end cutting units. Each cutting unit consists of blades pivotally mounted on a rotor. A tongue adapted for connection to a tractor is pivotally connected to the frame intermediate the opposed sides thereof. Input drive shafts deliver power from a power-take-off shaft on the tractor to a generally vertical output drive shaft via a bevel gearbox. The generally vertical output dirve shaft is connected to one of the intermediate cutting units, and generally horizontal output drive shafts connect this one intermediate cutting unit to the other intermediate cutting units and to the end cutting units.

12 Claims, 3 Drawing Sheets

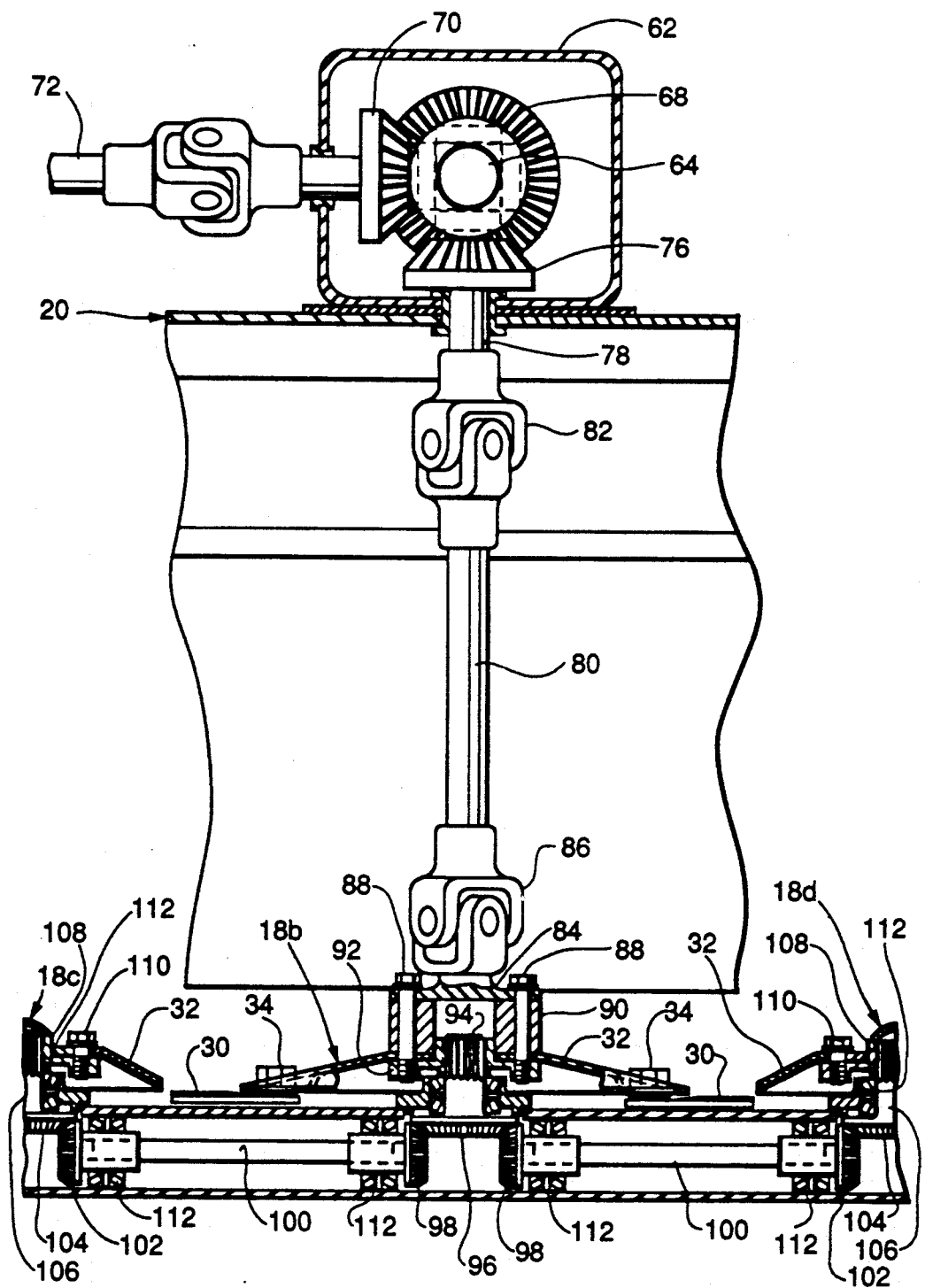

AGRICULTURAL MACHINE WITH A CUTTERBAR DRIVEN BY A GENERALLY VERTICAL DRIVE SHAFT

FIELD OF THE INVENTION

This invention relates generally to agricultural machines and, in particular, to agricultural machines typically referred to as mowers and mower conditioners. More specifically, this invention relates to an agricultural machine with a cutterbar driven by a generally vertical drive shaft.

BACKGROUND OF THE INVENTION

U.S Pat. No. 4,899,523 to Frumholtz et al discloses a mower having a frame, a tongue pivotally connected to the frame near the center thereof, and a disc cutterbar carried by the frame. The disc cutterbar includes a plurality of individual cutting units arranged side-by-side transversely of the frame. A main drive shaft connected to a power-take-off shaft on a tractor extends through the tongue to an upper input gearbox on the mower frame, and distribution shafts extend outwardly from a lower input gearbox to output gearboxes located adjacent outer ends of the cutterbar. The distribution shafts drive the cutting units located at the outer ends of the cutterbar while the intermediate cutting units are driven by the end cutting units.

A drawback of the mower disclosed in the Frumholtz et al patent is that power from the tractor is transmitted over a relatively long distance through the main drive shaft, the upper and lower input gearboxes, the distribution shafts, and the output gearboxes to the cutterbar. The Frumholtz et al mower has another drawback in that it utilizes four gearboxes (i.e. two input gearboxes and two output gearboxes) in order to drive the cutterbar.

SUMMARY OF THE INVENTION

It is an object of the present invention to provide an agricultural machine, such as a mower or a mower conditioner, that overcomes the drawbacks of the Frumholtz et al mower.

The present invention provides an agricultural machine comprising a frame carrying a cutterbar having a plurality of individual cutting units including two end cutting units located adjacent opposed sides of the frame and an intermediate cutting unit disposed between the end cutting units. A tongue is pivotally connected to the frame intermediate the opposed sides of the frame and adapted for attachment to a tractor. Means for driving the plurality of individual cutting units includes a generally vertical drive shaft connected to the intermediate cutting unit and a pair of generally horizontal drive shafts connecting the intermediate cutting unit and the end cutting units. The cutting units each comprise blades mounted on a rotor. The driving means comprises an input drive shaft connected to a power-take-off shaft on the tractor, and a bevel gearbox for transmitting power from the input drive shaft to the generally vertical drive shaft. The input drive shaft is connected to an input shaft on the bevel gearbox, and the generally vertical drive shaft has one end connected to an output shaft on the bevel gearbox. The generally vertical drive shaft has another end connected to a hub that is fastened to the rotor on the intermediate cutting unit.

DESCRIPTION OF THE DRAWINGS

FIG. 3 is a sectional view taken along lines 3—3 in FIG. 1.

DESCRIPTION OF THE PREFERRED EMBODIMENT

Figure 1:
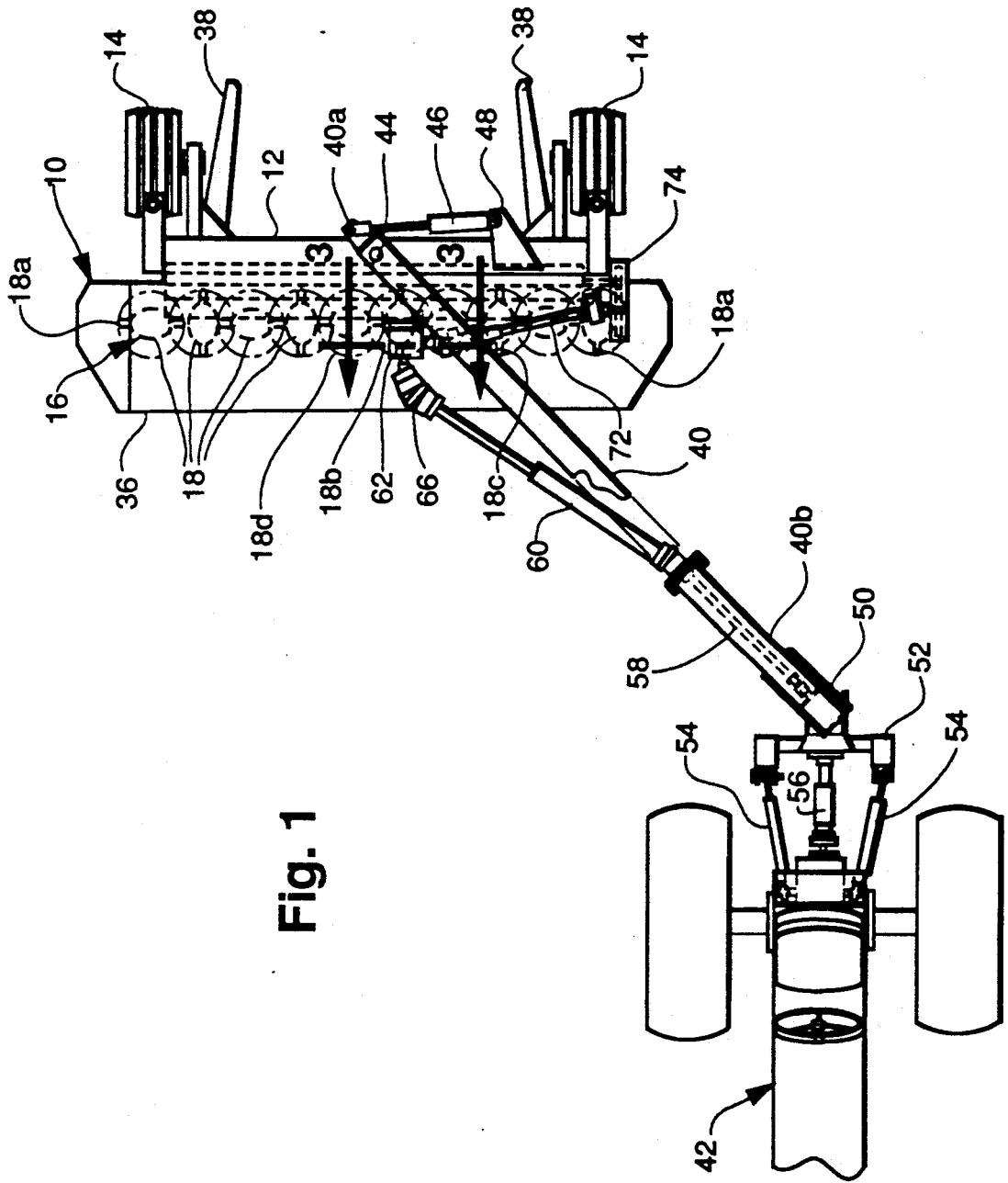
FIG. 1 is a top plan view of a mower conditioner connected to a tractor in accordance with the present invention.
Figure 2:
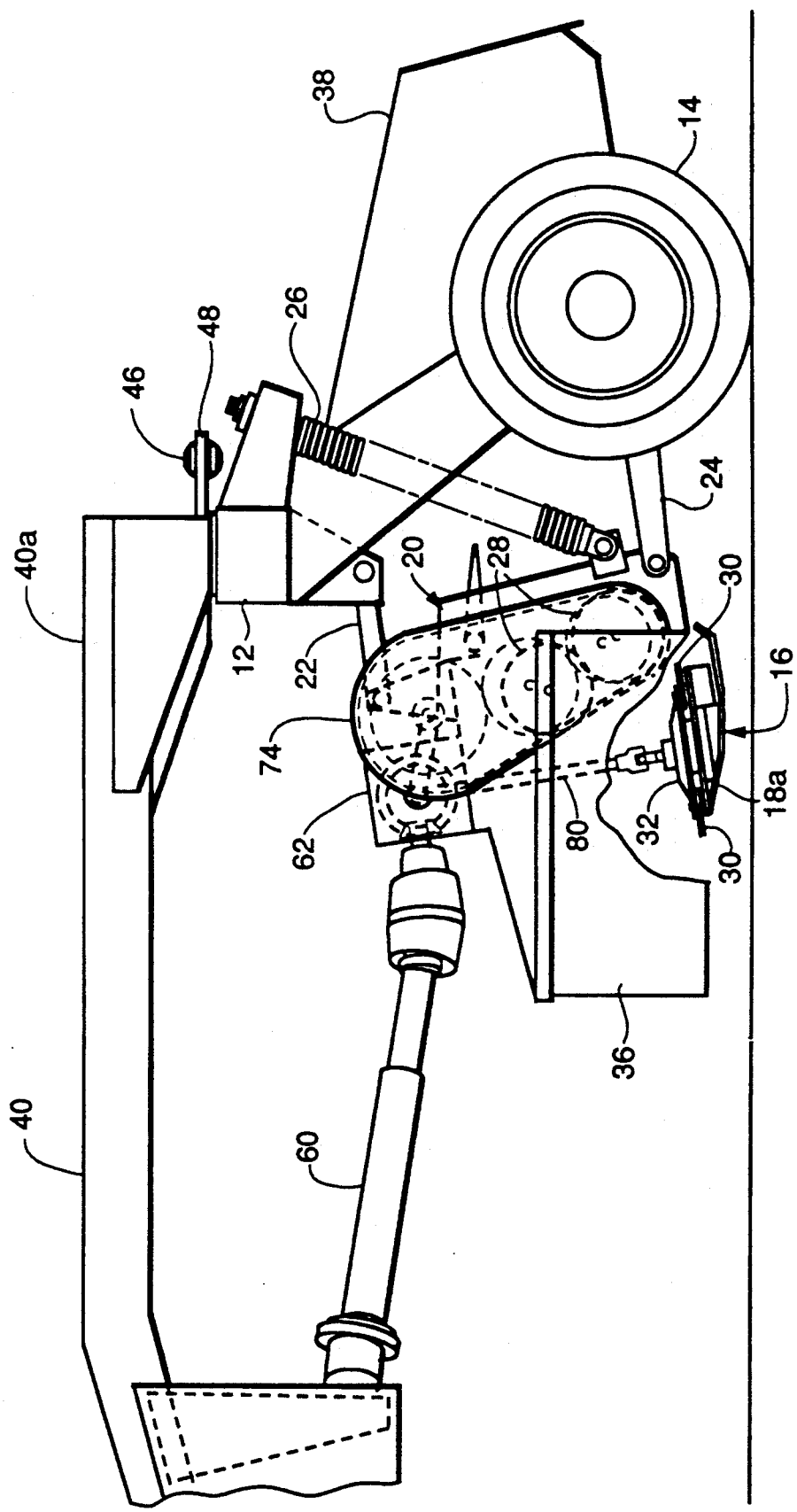
FIG. 2 is an enlarged side elevational view of the mower conditioner, shown in FIG. 1.

Referring to FIGS. 1 and 2, a mower conditioner 10 includes a frame 12 supported by a pair of wheels 14. A cutterbar 16 having a plurality of individual cutting units 18 is carried by a header 20 that is suspended from the frame 12 by upper and lower links 22, 24 and springs 26. The cutting units 18 include two end cutting units 18a located adjacent opposed sides of the frame 12. Each of the cutting units 18 includes a pair of blades 30 pivotally mounted on opposite sides of a rotor 32 by bolts 34. A pair of conditioning rolls 28 are mounted in the header 20 substantially rearwardly of the cutterbar 16. The header 20 includes a flexible curtain 36 which is disposed in front of the cutterbar 16. Crop deflector shields 38 are mounted on the frame 12 behind the header 20.

A tongue 40 is connected between the mower conditioner 10 and a tractor 42. A trailing end 40a of the tongue 40 is pivoted on a post 44 mounted on the mower conditioner frame 12 near the center thereof. A hydraulic cylinder 46 is connected between the trailing end 40a of the tongue 40 and a bracket 48 mounted on the frame 12. The hydraulic cylinder 46 may be extended and retracted to move the tongue 40 between a position where the 10 mower conditioner 10 is disposed on one side of the tractor 42 and another position where the mower conditioner 10 is disposed on the other side of the tractor 42. When the hydraulic cylinder 46 is fully extended, the mower conditioner 10 is swung to the right side of the tractor 42 as shown in FIG. 1, but when the hydraulic cylinder 46 is fully retracted, the mower conditioner 10 is swung to the left side of the tractor 42. The mower conditioner 10 may also be swung into a transport position directly behind the tractor 42 by partially extending the hydraulic cylinder 46. A swivel hitch 50, such as disclosed in U.S. application Ser. No. 07/708,314 of K. W. McLean et al filed May 31, 1991 and incorporated herein by reference, is attached to a leading end 40b of the tongue 40. The swivel hitch 50 is connected to a yoke assembly 52 which is attached to a pair of lower links 54 on the tractor 42. A power-take-off shaft 56 on the tractor 42 delivers power through input drive shafts 58, 60 to a bevel gearbox 62 mounted on the header 20 of the mower conditioner 10.

Referring now also to FIG. 3, the bevel gearbox 62 has an input shaft 64 that is coupled to the input drive shaft 60 by a universal joint 66. A bevel gear 68 on the input shaft 64 meshes with a bevel gear 70 rotatably mounted in the gearbox 62. The bevel gear 70 rotates an output drive shaft 72 which extends from the gearbox 62 toward one end of the header 20 where it delivers power to a transmission 74 which rotates the conditioning rolls 28. Another bevel gear 76 on an output shaft 78 of the gearbox 62 also meshes with the bevel gear 68. An output drive shaft 80 has one end connected by a universal joint 82 to the output shaft 78 while the other end of the drive shaft 80 is connected to a hub 84 by another universal joint 86. The output drive shaft 80 is disposed in a generally vertical orientation.

Hub 84 is fastened to the rotor 32 on an intermediate cutting unit 18b by bolts 88 which extend through a spacer ring 90 into threaded engagement with another hub 92 which has a splined connection with a stub shaft 94. The stub shaft 94 carries a bevel gear 96 that meshes with two other bevel gears 98 carried on two output drive shafts 100. The drive shafts 100 are disposed in a generally horizontal orientation and also carry bevel gears 102 which mesh with bevel gears 104 on stub shafts 106. The stub shafts 106 have a splined connection with a hub 108 that is fastened by bolts 110 to the rotors 32 on adjacent intermediate cutting units 18c, 18d. Roller bearings 112 rotatably support the stub shafts 94, 106 and the drive shafts 100.

During operation of the mower conditioner 10, power is delivered from the power-take-off shaft 56 on the tractor 42 through the input drive shafts 58, 60 and the bevel gearbox 62 to the output drive shaft 80 which rotates the rotor 32 on the cutting unit 18b. Rotation of this rotor 32 causes rotation of the stub shaft 94 and the output drive shafts 100. Rotation of the drive shafts 100 results in rotation of the stub shafts 106 which rotate the rotors 32 on the adjacent cutting units 18c, 18d. The rotors 32 on the cutting units 18c, 18d rotate in the same direction which is opposite the direction of rotation of the rotor 32 on the cutting unit 18b. The rotors 32 on the remaining intermediate cutting units 18 and the end cutting units 18a are driven by further arrangements of drive shafts 100 and stub shafts 106.

What is claimed is:

1. An agricultural machine comprising:
   a frame carrying a cutterbar having a plurality of transversely disposed individual rotatable cutting units including two laterally spaced end cutting units located adjacent opposed sides of said frame and at least one intermediate cutting unit disposed between said end cutting units;
   means for rotatably driving said cutting units including a generally vertical drive shaft connected to one said intermediate cutting unit to effect rotation thereof and directly drive said one intermediate cutting unit; and
   power transfer means operably connected to said means for rotatably driving said cutting units to transfer rotational power between said one intermediate cutting unit to said end cutting units for rotatably driving said end cutting units and any intermediate cutting units therebetween, whereby all of said cutting units are rotatably driven from said generally vertical drive shaft.

2. The agricultural machine of claim 1, wherein said cutting units each comprise blades mounted on a rotor.

3. The agricultural machine of claim 2, wherein said driving means comprises an input drive shaft connected to a power-take-off shaft on the tractor, and a bevel gearbox for transmitting power from said input drive shaft to said generally vertical drive shaft.

4. The agricultural machine of claim 3, wherein said input drive shaft is connected to an input shaft on said bevel gearbox, and wherein said generally vertical drive shaft has one end connected to an output shaft on said bevel gearbox.

5. The agricultural machine of claim 4, wherein said generally vertical drive shaft has another end connected to a hub that is fastened to the rotor on said one intermediate cutting unit.

6. The agricultural machine of claim 1, further comprising conditioning means carried by said frame and located substantially rearwardly of said one cutterbar.

7. The agricultural machine of claim 1, a tongue pivotally connected to said frame between the opposed sides thereof and adapted for attachment to a tractor.

8. The agricultural machine of claim 7, further comprising means for moving said tongue between a position where the agricultural machine is disposed on one side of the tractor and another position where the agricultural machine is disposed on the other side of the tractor.

9. The agricultural machine of claim 8, wherein said means for moving comprises a hydraulic cylinder connected between said tongue and said frame.

10. The agricultural machine of claim 1, wherein said driving means further comprises a pair of generally horizontal drive shafts connecting said one intermediate cutting unit to said end cutting units.

11. A mower conditioner comprising:
    a frame supporting a header;
    a transverse cutterbar carried by said header for severing crop material in a field, said cutterbar having a plurality of individual rotatable cutting units generally linearly disposed along the transverse length of said cutterbar and including two laterally spaced and cutting units located adjacent opposed sides of said frame and a plurality of intermediate cutting units disposed between said end cutting units;
    conditioning means mounted in said header substantially rearwardly of said cutterbar for conditioning crop material after it has been severed by said cutterbar;
    a tongue pivotally connected to said frame intermediate the opposed sides of said frame and adapted for attachment to a tractor; and
    means for driving said cutting units including a generally vertical drive shaft connected to one of said intermediate cutting units forwardly of said conditioning means and a pair of generally horizontal drive shafts operatively extending respectively between said one intermediate cutting unit and said end cutting units such that all of said cutting units are rotatably driven from said generally vertical drive shaft.

12. The agricultural machine of claim 11, wherein said driving means comprises an input drive shaft connected to a power-take-off shaft on the tractor, a bevel gearbox for transmitting power from said input drive shaft to said generally vertical drive shaft, and an output shaft connected to said bevel gearbox for operating said conditioning means.

* * * * *